Oct. 3, 1933.  B. W. ST. CLAIR  1,929,292

SUPPRESSED ZERO INSTRUMENT

Filed Sept. 4, 1931

Inventor:
Byron W. St.Clair,
by *Charles V. Tullar*
His Attorney.

Patented Oct. 3, 1933

1,929,292

UNITED STATES PATENT OFFICE 1,929,292

SUPPRESSED ZERO INSTRUMENT

Byron W. St. Clair, Lynn, Mass., assignor to General Electric Company, a corporation of New York Application September 4, 1931. Serial No. 561,263

6 Claims. (Cl. 171—95)

My invention relates to measuring instruments and in particular to electrical instruments in which the zero and the lower portion of the scale are suppressed.

An object of my invention is to produce an instrument in which a fractional variation in the measured quantity produces a variation in the scale detection from zero to a maximum.

Another object of my invention is to produce an instrument which will be highly sensitive to minute variations in the measured quantity without loss in accuracy.

A further object of my invention is to provide a device which will not be subject to strains in any of its parts when the measured quantity remains below that corresponding to a zero deflection and in which the parts will not be subject to violent stresses when the measured quantity falls from a value within the scale of the instrument to a smaller value.

Still another object is to produce a suppressed zero instrument in which a relatively high constancy of calibration is obtained by eliminating strains when the instrument is not in use or when the measured quantity is below that giving a zero deflection. Further objects will become apparent as the description proceeds.

In the usual form of zero suppression restraining springs are utilized. However, the stresses set up in the springs tend to cause serious errors in the course of time.

In carrying out my invention, I provide a compound instrument having a moving element acted upon by opposing torques. If desired the instrument may consist of two mechanically connected instrument units.

One unit of the opposed torque instrument is arranged to produce a down-scale deflection and the other unit to produce an up-scale deflection. The two units follow different laws of the relationship between torque and the magnitude of the quantity measured and the instrument is so designed that the opposing torques are balanced at a point which corresponds to the minimum reading of the instrument and one of the torques over-balances the other from that point upwards to provide readings over a scale which represents a fraction of the value of the maximum quantity which can be measured.

The features of my invention which I believe to be novel and patentable are pointed out in the claims appended hereto.

Figure 1:
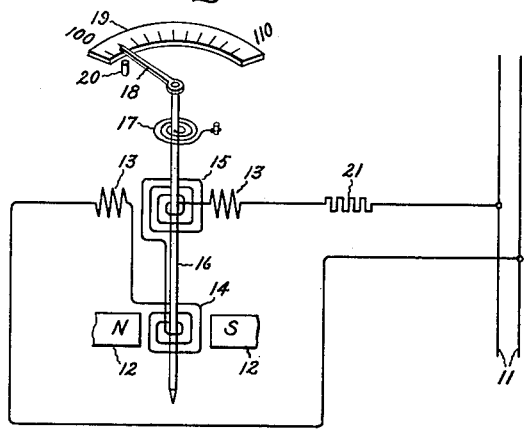
Figure 2:
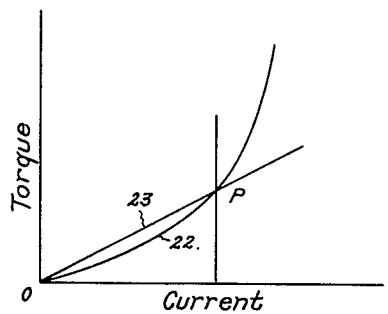
Figure 3:
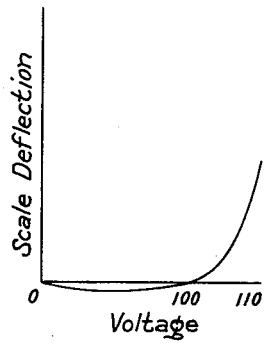

For a more complete understanding of my invention, reference may be had to the accompanying drawing in which Fig. 1 represents a device employing the principle of my invention arranged as a voltmeter; Fig. 2 represents the torques acting upon the moving element, and Fig. 3 represents the scale deflection produced in terms of the magnitude of the quantity measured.

I have shown the device arranged to measure the voltage of a direct current circuit 11 but it will be understood that my invention also includes instruments arranged to measure other quantities, and responsive to either alternating or direct current, or other suitable media for producing opposing torques in accordance with a measured quantity.

In the arrangement shown by way of illustration, I provide stationary field producing elements 12 and 13 and a moving element carrying coils 14 and 15 arranged to act oppositely. The elements 12 and 14 form a unit of the direct current D'Arsonval type and the elements 13 and 15 form a unit of the electro-dynamometer type. However, it will be understood that my invention is not limited to the use of instrument units of these particular types.

The torque produced in the D'Arsonval unit varies in proportion to the current flowing through the moving coil 14, whereas the torque produced in the dynamometer unit varies as the square of the current flowing through moving coils 15 and the stationary coils 13 connected in series therewith. In my device the coils 14 and 15 are connected in series and are mechanically attached to the same shaft 16, so that the same current is measured by both units and opposing torques act upon the moving element. Shaft 16 is biased by means of the spring 17 to the position of zero deflection at which the pointer 18 indicates the minimum reading upon a scale 19 which may be calibrated directly in terms of the quantity measured. In the example shown the instrument measures voltages over a range of from 100 to 110 volts, but it will be understood that the instrument may be arranged to have a range which is either a smaller or a large fraction of the value of the maximum reading.

I may in some cases provide a stop 20 to prevent any negative deflection. A multiplying resistor 21 is provided having a suitable resistance to adjust the sensitivity of the instrument to the voltage of the circuit 11 to which it is connected.

Referring to Fig. 2, the curve 22 represents the torque produced in the moving coil 15 of the dynamometer unit and the curve 23 represents the torque produced in the moving coil 14 of the D'Arsonval unit. The two torques become equal and opposite at the point P which corresponds to 100 volts, the minimum reading of the instrument shown in Fig. 1.

Fig. 3 represents the scale deflection in terms of the voltage measured. The deflection is proportional to the difference in the torques shown in curves 22 and 23. It will be observed that for voltages varying from 0 to 100 the deflection is a small quantity and negative whereas from the point 100 up to the maximum range of the instrument the deflection is positive and increases rapidly. Accordingly, the sensitivity of the instrument will be high within the range for which it is designed; furthermore, it will be unnecessary to provide restraining springs to prevent the deflection of the instrument until the voltage reaches the value 100.

Although I have illustrated an instrument of the indicating type, it will be understood that my invention is not limited to indicating instruments or devices.

Obviously if continuous indications of the value of the measuring quantity are not desired but merely an indication whether its value falls above or below a pre-determined magnitude the spring 17 may be omitted since it is an inherent characteristic of my device to deflect in opposite directions for values of the measured quantity on opposite sides of the balance point.

While I have shown and described a particular embodiment of my invention and a method of operation embraced therein, for the purpose of explaining its principle and showing its application, it will be obvious to those skilled in the art that many modifications and variations are possible and I aim, therefore, to cover all such modifications and variations as fall within the scope of my invention as defined in the appended claims.

What I claim as new and desire to secure by Letters Patent of the United States is:—

1. A measuring instrument of the suppressed zero type having a current conducting moving element carrying current proportional to the measured quantity and having stationary field producing elements causing the moving element to be acted upon by opposing forces each dependent upon the magnitude of the measured quantity, and following a different law of relationship thereto so as to give a positive deflection of the instrument only when the measured quantity has attained a given magnitude.

2. A current responsive measuring instrument having a scale and having stationary and movable elements forming a pair of torque producing units responsive to the same current, said elements comprising means for causing opposing forces to react upon said moving elements, one of said forces varying substantially linearly with the measured quantity and producing a down scale torque and the other of said forces varying substantially as a square of said measured quantity and producing an up scale torque, said forces becoming equal and opposite at a point in the lower portion of the scale of said instrument.

3. A measuring instrument having a range which is a fraction of the maximum quantity measured by said instrument and comprising a movable member biased to a position corresponding to a value of the measured quantity at one end of the range of said instrument and carrying a pair of current conducting coils connected in series, a stationary member including a pair of independent field producing elements with which said coils are respectively in inductive relation, said field producing elements and said coils reacting with forces which follow different laws of relationship between the force produced and the magnitude of the quantity measured but which become equal and opposite at the point to which the moving element is biased.

4. An electrical measuring instrument having a range which is a fraction of the maximum quantity measured by said instrument, and comprising a movable member biased to a position corresponding to the value of the measured quantity at the lower end of the range of said instrument and carrying a pair of current conducting moving coils connected in series, a stationary permanent magnet in inductive relation with one of said coils and a stationary coil in inductive relation with the other of said moving coils and connected in series therewith, said moving coils being acted upon by forces which become equal and opposite at the value of the measured quantity corresponding to the position to which the movable member is biased.

5. An electrical measuring instrument comprising a pair of current responsive torque producing units responsive to the same current but having different laws of torque variation with changes in current, said torque producing units having moving elements mounted on the same shaft with their torques in opposition, and a spring for biasing said shaft to a rotary position at which the opposing torques are equal.

6. An electrical measuring instrument comprising a pair of current responsive torque producing units responsive to the same current with their moving elements on the same shaft, a pointer on said shaft, a graduated scale with which said pointer cooperates, a spring for biasing said shaft to the lower end of the scale, said two torque producing units having opposing torques, one of which tends to move the pointer up scale and varies at a greater rate than the other with variations in the current to which both are responsive, said torques being equal when the pointer is at the lower end of the scale.

BYRON W. ST. CLAIR.